United States Patent
Fujii

(10) Patent No.: US 7,020,466 B2
(45) Date of Patent: Mar. 28, 2006

(54) MOBILE RADIOTELEPHONE CONNECTING APPARATUS AND MOBILE RADIOTELEPHONE CONNECTING SYSTEM

(75) Inventor: Kohei Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 460 days.

(21) Appl. No.: 10/180,058

(22) Filed: Jun. 27, 2002

(65) Prior Publication Data
US 2003/0003869 A1    Jan. 2, 2003

(30) Foreign Application Priority Data
Jun. 28, 2001    (JP)    .............................. 2001-196780

(51) Int. Cl.
*H04Q 7/20*    (2006.01)
*H04Q 7/24*    (2006.01)
*H04B 3/36*    (2006.01)
*H04B 7/14*    (2006.01)
*H04B 7/00*    (2006.01)

(52) U.S. Cl. .......................... 455/433; 455/7; 455/13.1; 455/15; 455/16; 455/41; 455/422.1; 455/432.1; 455/445; 455/435.1; 370/338

(58) Field of Classification Search .................... 455/7, 455/13.1, 15, 16, 41.1, 41.2, 41.3, 433, 422.1, 455/432.1, 435–440, 445; 370/338
See application file for complete search history.

(56) References Cited

U.S. PATENT DOCUMENTS

| | | | | |
|---|---|---|---|---|
| 5,490,139 A | * | 2/1996 | Baker et al. | ................. 455/417 |
| 6,330,244 B1 | * | 12/2001 | Swartz et al. | ............... 370/401 |
| 6,473,413 B1 | * | 10/2002 | Chiou et al. | ............. 455/432.1 |
| 6,647,264 B1 | * | 11/2003 | Sasamoto | .................... 455/445 |
| 6,904,277 B1 | * | 6/2005 | Tsutsumi et al. | ........... 455/411 |

FOREIGN PATENT DOCUMENTS

| | | |
|---|---|---|
| EP | 0 766 427 A2 | 4/1997 |
| EP | 1 122 648 A2 | 8/2001 |
| GB | 2 336 069 A | 10/1999 |
| GB | 2 363 291 A | 12/2001 |
| GB | 2 366 952 A | 3/2002 |
| JP | A 8-65250 | 3/1996 |
| JP | 08-289339 | 11/1996 |
| JP | 09-009334 | 1/1997 |
| WO | 00/69186 | 11/2000 |
| WO | 02/17564 A2 | 2/2002 |

* cited by examiner

*Primary Examiner*—Nick Corsaro
*Assistant Examiner*—Wen Huang
(74) *Attorney, Agent, or Firm*—Young & Thompson

(57) ABSTRACT

A mobile radiotelephone connecting apparatus and system by which mobile type telephone conversation can be realized using a network is disclosed. A plurality of groups each including a mobile radiotelephone set, a mobile radiotelephone connecting apparatus and a personal computer are connected to one another through a LAN. The mobile radio telephone connecting apparatus includes a Bluetooth interface for performing low-power radio communication, a LAN interface for establishing a connection to the LAN, a USB interface for establishing connection to the personal computer, and a CPU interposed among the mobile ratio telephone set, LAN and personal computer for allowing communication among the three.

6 Claims, 8 Drawing Sheets

MOBILE RADIOTELEPHONE CONNECTING APPARATUS AND MOBILE RADIOTELEPHONE CONNECTING SYSTEM

BACKGROUND OF THE INVENTION

1. Field of the Invention

This invention relates to a mobile radiotelephone connecting apparatus and a mobile radiotelephone connecting system, and more particularly to a mobile radiotelephone connecting apparatus which has a low-power radio communication function for performing radio communication with low power or an optical communication function for performing communication using light and a connecting function to a network such as a LAN (Local Area Network) and is used in combination with a mobile radiotelephone set having the low-power radio communication function or the optical communication function to realize mobile radiotelephone conversation using a network such as a LAN and a mobile radiotelephone connecting system which includes a plurality of groups each including a mobile radiotelephone connecting apparatus and a mobile radiotelephone set and uses a network such as a LAN as a path.

2. Description of the Related Art

Conventionally, a technique has been proposed which uses a low-power radio communication function or an optical communication function provided for a mobile radiotelephone set to establish a connection to a fixed circuit-telephone line. This is intended to utilize a less expensive circuit such as a fixed circuit telephone line while maintaining environments of use such that a telephone call can be originated at any place by making use of an address list in which mobile radiotelephone sets are registered.

Further, in companies or the like, use of a mobile radio type private telephone set such as a PHS (Personal Handyphone System) as a local telephone set has been and is increasing. However, in order to utilize a PHS, local equipment for exclusive use for the PHS is required.

Meanwhile, as a conventional connecting method for such a fixed circuit telephone line as described above, a proposal has been made wherein the Bluetooth is used to establish a connection to a fixed circuit telephone line (by Ericsson and so forth).

Meanwhile, such a local telephone set as described above is disclosed, for example, in Japanese Patent Laid-Open No. 289339/1996 entitled "Local Telephone Service Providing Method and Apparatus" or Japanese Patent Laid-Open No. 009334/1997 entitled "Exchange Apparatus for the PHS".

However, the conventional techniques described above have the following problems.

If it is intended to realize local telephone conversation with a special telephone set (mobile radiotelephone set) such as a PHS using a LAN (Local Area Network) without using PHS local telephone equipment, then a mobile radiotelephone connecting apparatus to the LAN must be able to operate immediately. In other words, communication through the LAN must always be kept established. The reason is that, while it is required, in an application of a telephone set, that telephone conversation can be performed immediately after a telephone call is originated, if a connection to the LAN is established after a telephone call is originated, then the time for validation such as connection authentication deteriorates the convenience. Not only when a connection is established to a destination mobile radiotelephone set through the LAN and a mobile radiotelephone connecting apparatus, but also when a telephone call is originated from another mobile radiotelephone set through the LAN, the mobile radiotelephone connecting apparatus must always be prepared for utilization.

SUMMARY OF THE INVENTION

It is an object of the present invention to provide a mobile radiotelephone connecting apparatus and a mobile radiotelephone connecting system by which mobile type telephone conversation can be realized using a network.

In order to attain the object described above, according to the present invention, a mobile radiotelephone connecting apparatus and a mobile radiotelephone set both having a low-power radio communication function or an optical communication function are used in combination.

It is another object of the present invention to provide a mobile telephone connecting apparatus and a mobile telephone conversation by which a mobile radiotelephone set which can handle common data such as text data in addition to voice can communicate data with a personal computer.

In order to attain the object described above, according to the present invention, when a mobile radiotelephone set which can handle common data such as text data in addition to voice tries to perform data exchange between a text in the mobile radiotelephone set and a personal computer owned by a user itself of the mobile radiotelephone set, if the personal computer is located in the proximity of the mobile radiotelephone set, the data communication is performed directly between the mobile radiotelephone set and the personal computer, but if the personal computer is not located in the proximity of the mobile radiotelephone set but is located at a place where a network is available, the mobile radiotelephone set and the personal computer are connected to each other through a mobile radiotelephone connecting apparatus and the network thereby to allow data communication to be performed between the mobile ratio telephone set and the personal computer.

More particularly, in order to attain the objects described above, according to an aspect of the present invention, there is provided a mobile radiotelephone connecting apparatus, comprising first communication means for performing first communication with a mobile radiotelephone set by low-power radio communication or optical communication, second communication means for performing second communication with a second mobile radiotelephone connecting apparatus through a network, and relaying means for relaying the first communication by the first communication means and the second communication by the second communication means.

The mobile radiotelephone connecting apparatus may be configured such that communication between a mobile radiotelephone set which performs the first communication with the mobile radiotelephone connecting apparatus and another mobile radiotelephone set which performs the first communication with the second mobile radiotelephone connecting apparatus can be performed through the first communication means and the second communication means of the mobile radiotelephone connecting apparatus and the first communication means and the second communication means of the second mobile radiotelephone connecting apparatus.

The mobile radiotelephone connecting apparatus may further comprise third communication means for performing third communication with a computer, and second relaying means for relaying the first communication and the third communication. In this instance, the mobile radiotelephone connecting apparatus may be configured such that it further comprises third relaying means for relaying the second communication and the third communication, and communication between a mobile radiotelephone set which performs the first communication with the mobile radiotelephone connecting apparatus and the computer which performs the third communication with the second mobile radiotelephone connecting apparatus can be performed through the first communication and the second communication of the mobile radiotelephone connecting apparatus and the third communication and the second communication of the second mobile radiotelephone connecting apparatus.

The mobile radiotelephone connecting apparatus may further comprise an initial location table for storing a corresponding relationship between identifiers of mobile radiotelephone sets and mobile radiotelephone connecting apparatus including the mobile radiotelephone connecting apparatus in an initial state, a mobile radiotelephone connecting apparatus address table for storing network addresses of the individual mobile radiotelephone connecting apparatus, first search means for searching, when a telephone call is originated from a mobile radiotelephone set to another mobile radiotelephone set, for the identifier of a mobile radiotelephone connecting apparatus corresponding to the identifier of the second mobile radiotelephone set from within the initial location table, second search means for searching for a network address corresponding to the searched out identifier of the mobile radiotelephone connecting apparatus from within the mobile radiotelephone connecting apparatus address table, and transmission means for transmitting a line open request including the identifier of the mobile radiotelephone set having originated the telephone call to the mobile radiotelephone connecting apparatus of the searched out network address.

In this instance, the mobile radiotelephone connecting apparatus may be configured such that it further comprises a base table for storing, when a mobile radiotelephone set connected to the mobile radiotelephone connecting apparatus in the initial state moves and is connected to another mobile radiotelephone connecting apparatus, a corresponding relationship between the identifier of the radiotelephone set having moved and the identifier of the mobile radiotelephone connecting apparatus connected at the location after the movement, discrimination means for discriminating, when the line open request is received, whether or not the identifier of a mobile radiotelephone connecting apparatus corresponding to the identifier of the mobile radiotelephone set having originated the telephone call is stored in the base table, replying means for issuing, if the identifier of the mobile radiotelephone connecting apparatus corresponding to the identifier of the mobile radiotelephone set having originated the telephone call is stored in the base table, a negative acknowledge including the identifier of the mobile radiotelephone connecting apparatus to the line open request, and third search means for searching, when the negative acknowledge to the line open request is received, for a network address corresponding to the identifier of the mobile radiotelephone connecting apparatus included in the negative acknowledge from within the mobile radiotelephone connecting apparatus address table, and the transmission means transmits a line open request including the identifier of the mobile ratio telephone set having originated the telephone call to a mobile radiotelephone connecting apparatus of the searched out network address corresponding to the identifier of the mobile radiotelephone connecting apparatus included in the negative acknowledge.

According to another aspect of the present invention, there is provided a mobile radiotelephone connecting system, comprising a plurality of mobile radiotelephone connecting apparatus, and a location reference server including a dynamic location table for storing a corresponding relationship between identifiers of mobile radiotelephone sets and identifiers of those of the mobile radiotelephone communicating apparatus with which the mobile radiotelephone sets can currently communicate, each of the mobile radiotelephone connecting apparatus including first communication means for performing first communication with a mobile radiotelephone set by low-power radio communication or optical communication, second communication means for performing second communication with a second mobile radiotelephone connecting apparatus through a network, relaying means for relaying the first communication by the first communication means and the second communication by the second communication means, a mobile radiotelephone connecting apparatus address table for storing network addresses of the mobile radiotelephone connecting apparatus, first search means for communicating, when a telephone call is originated from a first one of the mobile radiotelephone sets to second one of the mobile radiotelephone sets, with the location reference server to search for an identifier of a mobile radiotelephone connecting apparatus corresponding to an identifier of the second mobile radiotelephone set from within the dynamic location table, second search means for searching for the network address corresponding to the searched out identifier of the mobile radiotelephone connecting apparatus from within the mobile radiotelephone connecting apparatus address table, and transmission means for transmitting a line open request including the identifier of the mobile radiotelephone set having originated the telephone call to the mobile radiotelephone connecting apparatus of the search out network address.

With the mobile radiotelephone connecting apparatus and the mobile radiotelephone connecting system, the following advantages are achieved.

(1) Although use of a local mobile radiotelephone set different from a public mobile radiotelephone set to use of which a user is familiar gives rise to a failure to make the most of functions of the local mobile radiotelephone set to use of which the user is not familiar or, for example, due to addition of novel functions incorporated in a local mobile radiotelephone set, a local mobile radiotelephone set of an old model cannot use the latest functions incorporated in another local mobile radiotelephone set of a novel type placed on the market after several years, with the mobile radiotelephone connecting apparatus and the mobile radiotelephone connecting system according to the present invention, since a mobile radiotelephone connecting apparatus is provided, not only when a network is used to originate a telephone call, but also when a public mobile radio circuit is used to originate a telephone call, the same mobile radiotelephone set can be used and the necessity for skilled operation in use of two telephone sets and movement of data between two telephone sets can be eliminated.

(2) If a method wherein an interface for performing low-power radio communication or optical communication and another interface for establishing a connection to a network are incorporated in a computer and a local mobile radiotelephone system is implemented using software, each time the operating system (OS) of the computer changes, the setting for data communication changes. Further, since the MTBF (Mean Time Between Failure) is not necessarily long with the OS of the computer, communication is sometimes disabled. However, with the mobile radiotelephone connecting apparatus and the mobile radiotelephone connecting system according to the present invention, a local mobile radiotelephone system which is stable without being influenced by a change of the OS of a computer can be implemented.

(3) Where a computer is used to implement a local mobile radiotelephone system with software as described in paragraph (2) above, several minutes are required to start up the OS of the computer, and time is required also for connection to a network. Therefore, the time for which a telephone set can use is limited. However, with the mobile radiotelephone connecting apparatus and the mobile radiotelephone connecting system according to the present invention, thanks to a mobile radiotelephone connecting apparatus, a local mobile ratio telephone set which can be used at any time can be provided.

(4) Since the mobile radiotelephone connecting apparatus is an apparatus having necessary but minimum functions, little problem occurs even where the power supply to it is normally kept on.

(5) Since the location of a mobile radiotelephone set is recorded in both of the location reference server and the mobile radiotelephone connecting apparatus, even if, for example, the location reference server fails, it is possible to grasp where the mobile radiotelephone set is located using the mobile radiotelephone connecting apparatus without using the location reference server to establish a connection of the mobile radiotelephone set.

(6) Where a mobile radiotelephone set and a mobile radiotelephone connecting apparatus have a communication function, for example, in accordance with the Bluetooth as a low-power radio communication function, since the radio wave range is short, the range of a mobile radiotelephone set within which the radio wave can be relayed by the mobile radiotelephone connecting apparatus is small. Consequently, the location of the mobile radiotelephone set can be specified to a range of several meters.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT (1) Description of the Configuration

Figure 1:
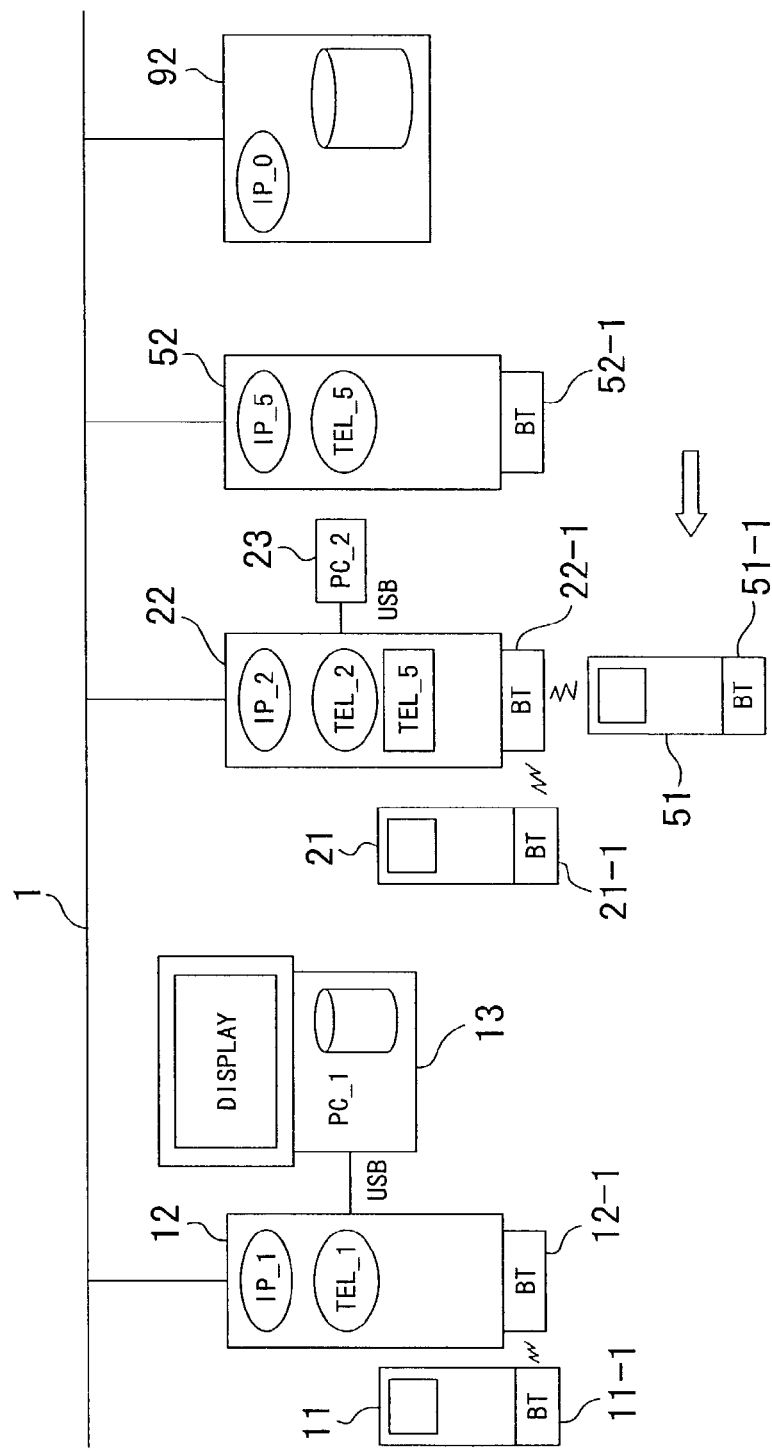
FIG. 1 is a schematic block diagram showing a general configuration of a local mobile radiotelephone system to which the present invention is applied.

Referring first to FIG. 1, is there is shown a configuration of a local mobile radiotelephone system to which the present invention is applied. The local mobile radiotelephone system shown includes a LAN 1, mobile radiotelephone sets 11, 21 and 51, mobile radiotelephone connecting apparatus 12, 22 and 52, personal computers 13 and 23, and a location reference server 92. The mobile radiotelephone sets 11, 21 and 51 and the mobile radiotelephone connecting apparatus 12, 22 and 52 include Bluetooth interfaces 11-1, 21-1, 51-1, 12-1, 22-1 and 52-1, respectively. It is to be noted that any number of such mobile radiotelephone sets, mobile radiotelephone connecting apparatus or personal computers may be provided in the local mobile radiotelephone system.

The mobile radiotelephone connecting apparatus 12, 22 and 52 have a low-power radio communication function by the Bluetooth interface or an optical communication function and include software with which communication can be performed with a mobile radiotelephone set having the same communication function. The mobile radiotelephone connecting apparatus 12 is connected to the personal computer 13 through an interface such as, for example, a USB (Universal Serial Bus). Similarly, the mobile radiotelephone connecting apparatus 22 is connected to the personal computer 23 through another interface such as a USB. Further, the mobile radiotelephone connecting apparatus 12, 22 and 52 have a network connection function to an address of the LAN 1 (an IP address, a MAC address of a lower layer and so forth) and are held in normal connection to the LAN 1. The mobile radiotelephone sets 11, 21 and 51 realize a communication function with the mobile radiotelephone connecting apparatus using hardware and software.

Figure 4:
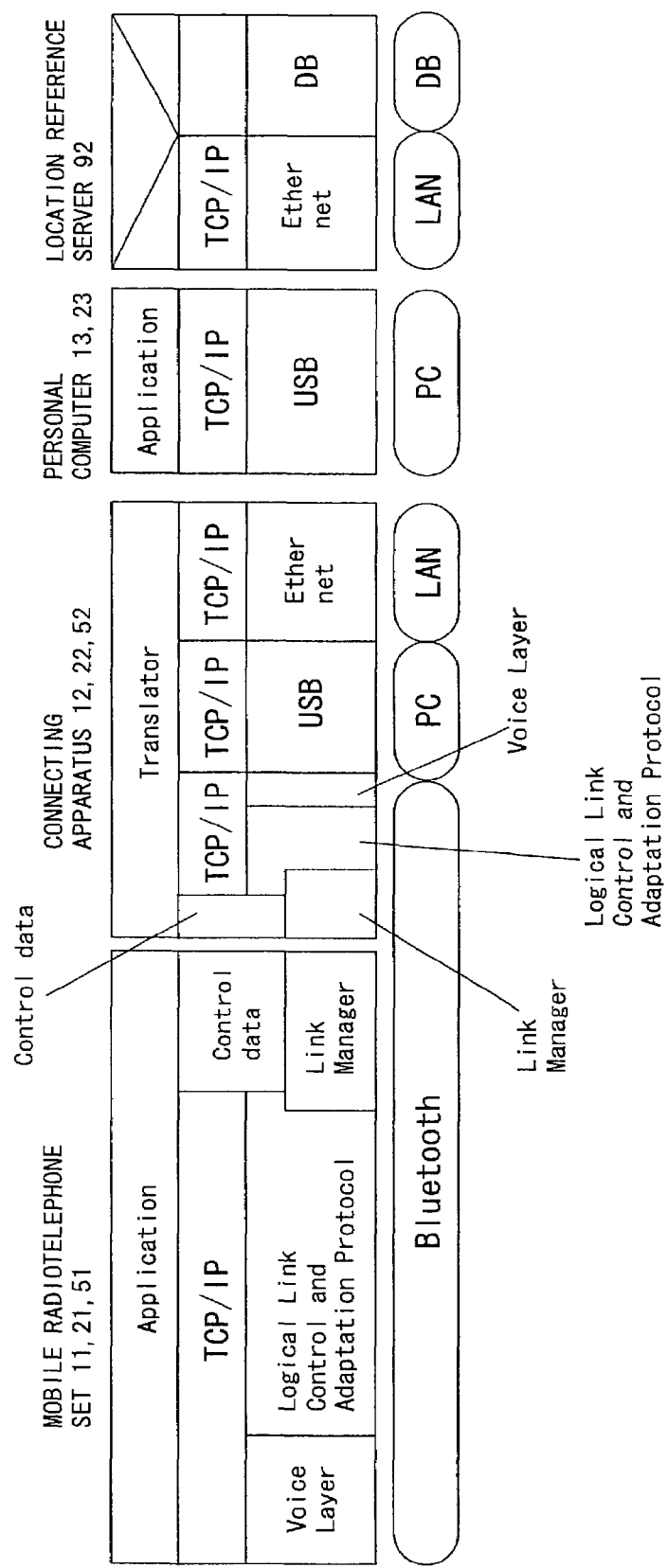
FIG. 4 is a diagrammatic view illustrating hierarchies of protocols of the mobile radiotelephone connecting apparatus, mobile radiotelephone set, personal computer and location reference server shown in FIG. 1.

FIG. 4 illustrates hierarchies of protocols of the mobile radiotelephone connecting apparatus 12, 22 and 52, mobile radiotelephone 11, 21 and 51, personal computers 13 and 23, and location reference server 92.

In the local mobile radiotelephone system, a mobile radiotelephone connecting apparatus, a personal computer and a mobile radiotelephone set form one group, and a plurality of such groups are provided in the LAN 1. When a user having a mobile radiotelephone set locally moves, the mobile radiotelephone set communicates after every fixed time with the nearest mobile radiotelephone connecting apparatus and can use the mobile radiotelephone connecting apparatus as a relaying apparatus. The fixed time just mentioned may range, for example, from 30 seconds to 5 minutes. An identifier of the mobile radiotelephone connecting apparatus determined as a new relaying apparatus as a result of the movement of the mobile radiotelephone set can be acquired by issuing an inquiry to the mobile radiotelephone connecting apparatus grouped together with the mobile radiotelephone set in the initial state or to the location reference server 92.

Figure 2:
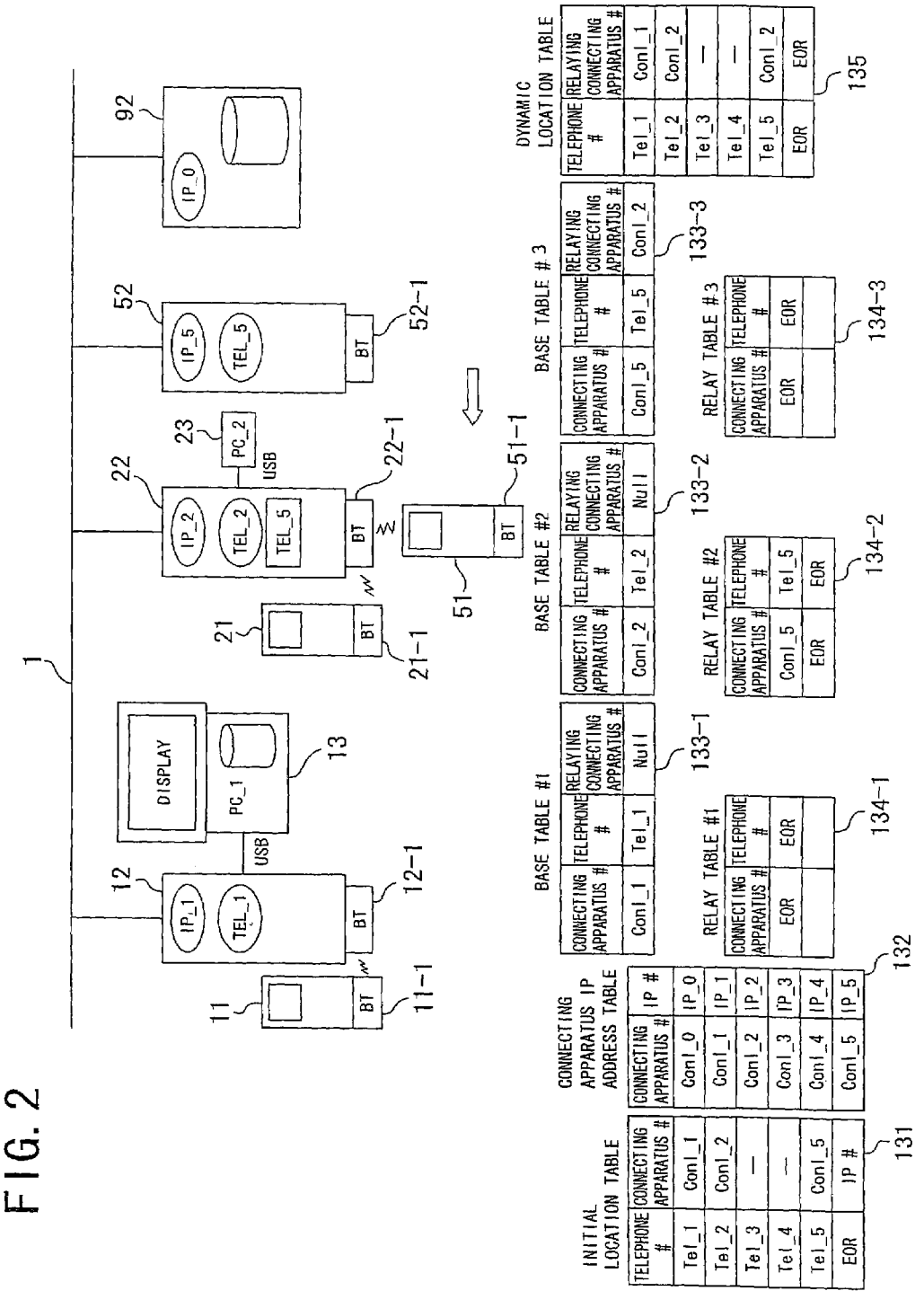
FIG. 2 is a schematic block diagram showing the local mobile radiotelephone system of FIG. 1 together with tables possessed by a mobile radiotelephone connecting apparatus, a mobile radiotelephone set, a personal computer and a location reference server of the local mobile radiotelephone system.

From FIG. 2, it can be seen that, in the local mobile radiotelephone system, the mobile radiotelephone connecting apparatus 12, mobile radiotelephone set 11 and personal computer 13 form one group, and the mobile radiotelephone connecting apparatus 22, mobile radiotelephone set 21 and personal computer 23 form another one group while the mobile radiotelephone connecting apparatus 52 and mobile radiotelephone set 51 form a further one group. It is to be noted that the mobile radiotelephone set 51 has cut, as a result of the movement of the user thereof, its connection to the mobile radiotelephone connecting apparatus 52 and has an established connection to the mobile radiotelephone connecting apparatus 22. Further, the number of mobile radiotelephone sets which form a group with one mobile radiotelephone connecting apparatus is not limited to one but may be 0 or 2 or more.

Further, FIG. 2 shows tables described below. All of the mobile radiotelephone connecting apparatus 12, 22 and 52 include a same initial location table 131 and a same mobile radiotelephone connecting apparatus IP address table 132 and further include base tables 133-1, 133-2 and 133-3, and relay tables 134-1, 134-2 and 134-3, respectively. Further, the location reference server 92 includes a dynamic location table 135.

The initial location table 131 indicates to which one of the mobile radiotelephone connecting apparatus each mobile radio telephone set is connected in an initial state. The mobile radiotelephone connecting apparatus IP address table 132 indicates an IP address unique to each of the mobile radiotelephone connecting apparatus.

The base table 133 (133-1, 133-2 or 133-3) indicates a mobile radiotelephone set connected to each of the mobile radiotelephone connecting apparatus in an initial state. Further, the base table 133 includes a field for indicating, if a mobile radiotelephone set connected to each of the mobile radiotelephone connecting apparatus moves and is connected to another one of the mobile radiotelephone connecting apparatus, the mobile radiotelephone connecting apparatus (relaying mobile radiotelephone connecting apparatus) connected to the mobile radiotelephone set at present.

The relay table 134 (134-1, 134-2 or 134-3) indicates a mobile radiotelephone set which was not connected in the initial state but is connected at present to the pertaining mobile radiotelephone connecting apparatus and another mobile radiotelephone connecting apparatus which was connected in the initial state. The dynamic location table 135 indicates a connection relationship between mobile radiotelephone sets and those mobile radiotelephone connecting apparatus which are connected at present to the mobile radiotelephone sets. The term EOR in the tables represents End Of Record.

In the configuration of FIG. 2, while the mobile radiotelephone set 51 is connected to the mobile radiotelephone connecting apparatus 52 in the initial state, the connection to the mobile radiotelephone connecting apparatus 52 is cut as a result of its movement and a connection to the mobile radiotelephone connecting apparatus 22 is established. Accordingly, a record including as values of the fields an identifier Tel_5 of the mobile radiotelephone set 51 and an identifier Conl_5 of the mobile radiotelephone connection apparatus 52 having a connection to the mobile radiotelephone set 51 in the initial state is recorded in the relay table 134-2 of the mobile radiotelephone connecting apparatus 22. Further, an identifier Conl_2 of the mobile radiotelephone connecting apparatus 22 is recorded in the field for a relaying mobile radiotelephone connecting apparatus of a record having Tel_5 as an identifier of a mobile radiotelephone set in the base table 133-3 of the mobile radiotelephone connecting apparatus 52.

Since the mobile radiotelephone set 11 remains connected to the mobile radiotelephone connecting apparatus 12 similarly as in the initial state, the field for a relaying mobile radiotelephone connecting apparatus of a record having an identifier Tel_1 of the mobile radiotelephone set 11 as a field of the base table 133-1 of the mobile radiotelephone connecting apparatus 12 is Null, and the identifier of the mobile radiotelephone set 11 and the identifier of the mobile radiotelephone connecting apparatus 12 are not recorded in the relay tables 134 of the other mobile radiotelephone connecting apparatus.

Similarly, since the mobile radiotelephone set 21 remains connected to the mobile radiotelephone connecting apparatus 22 similarly as in the initial state, the field for a relaying mobile radiotelephone connecting apparatus of a record having an identifier Tel_2 of the mobile radiotelephone set 21 as a field of the base table 133-2 of the mobile radiotelephone connecting apparatus 22 is Null, and the identifier of the mobile radiotelephone set 21 and the identifier of the mobile radiotelephone connecting apparatus 22 are not recorded in the relay tables 134 of the other mobile radiotelephone connecting apparatus.

Further, since the mobile radiotelephone set 51 has moved, while, in the initial location table 131, the identifier of a mobile radiotelephone connecting apparatus corresponding to the identifier Tel_5 of the mobile radiotelephone set 51 is Conl_5, in the dynamic location table 135, the identifier of a mobile radiotelephone connecting apparatus corresponding to the identifier Tel_5 of the mobile radiotelephone 51 is Conl_2.

On the other hand, since the mobile radiotelephone set 11 has not moved, in both of the initial location table 131 and the dynamic location table 135, the identifier of a mobile radiotelephone connecting apparatus corresponding to the identifier Tel_1 of the mobile radiotelephone set 11 is Conl_1. Similarly, since the mobile radiotelephone set 21 has not moved either, in both of the initial location table 131 and the dynamic location table 135, the identifier of a mobile radiotelephone connecting apparatus corresponding to the identifier Tel_2 of the mobile radiotelephone set 21 is Conl_2.

Figure 3:
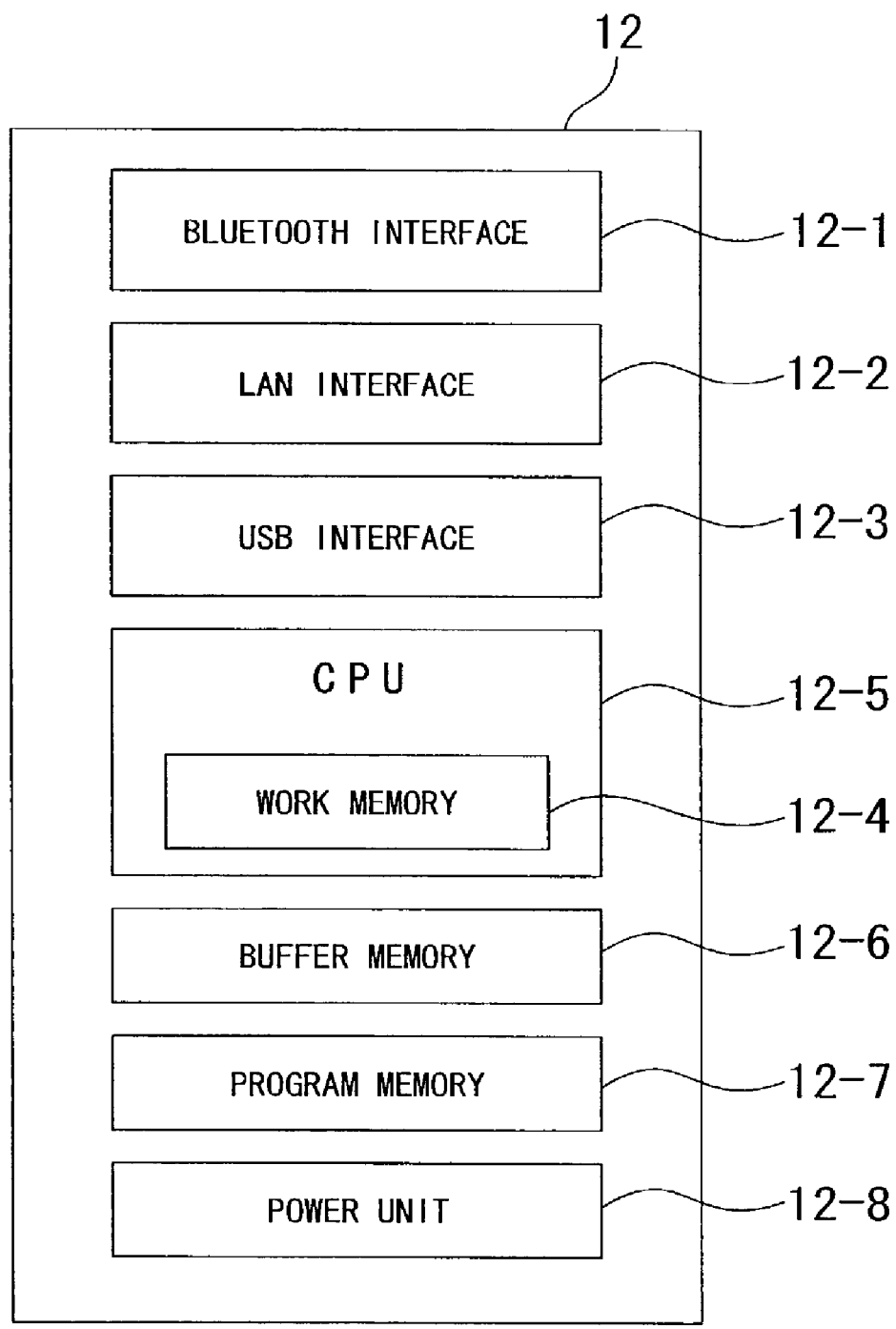
FIG. 3 is a block diagram showing a hardware configuration of the mobile radiotelephone connecting apparatus shown in FIG. 1.

FIG. 3 shows a hardware configuration of the mobile radiotelephone connecting apparatus 12. The mobile radiotelephone connecting apparatus 12 includes a Bluetooth interface 12-1 which performs low-power radio communication, a LAN interface 12-2 for establishing a connection to the LAN 1, a USB interface 12-3 for establishing a connection to the personal computer, a CPU 12-5 for controlling the components of the mobile radiotelephone connecting apparatus and including a work memory 12-4, a buffer memory 12-6 for temporarily storing communication information, a program memory 12-7 in which programs are stored, and a power unit 12-8 formed from a power supply and so forth. While it is described above that the mobile radiotelephone connecting apparatus have a low-power radio communication function and an optical communication function, FIG. 3 indicates that the communication function of the mobile radiotelephone connecting apparatus is implemented by the Bluetooth. It is to be noted that also hardware configurations of the mobile radiotelephone connecting apparatus 22 and 52 are similar to that of the mobile radiotelephone connecting apparatus 12 described above.

The mobile radiotelephone connecting apparatus 12, 22 and 52 have the low-power radio communication function by the Bluetooth interface or the optical communication function, and also the mobile radiotelephone sets 11, 21 and 51 have the same communication function. Further, the mobile radiotelephone connecting apparatus 12, 22 and 52 and the mobile radiotelephone sets 11, 21 and 51 have functions of telephone number notification, telephone voice transmission and message communication by the low-power radio communication function or the optical communication function.

Further, each of the mobile radiotelephone connecting apparatus 12, 22 and 52 can record and hold, into and in the mobile radiotelephone connecting apparatus, the identifier of the mobile radiotelephone connecting apparatus, an identifier of a mobile radiotelephone set which uses the mobile radiotelephone connecting apparatus as a base station, an identifier of a mobile radiotelephone set with which the mobile radiotelephone connecting apparatus can communicate using the low-power radio communication function or the optical communication function, and a correspondence table of LAN addresses corresponding to identifiers of a plurality of apparatus which are connected to the LAN 1 and to which data transmission from mobile radiotelephone connecting apparatus is possible, and has a function for referring to the correspondence tables of the identifiers and the LAN addresses from another mobile radiotelephone connecting apparatus through the LAN 1.

Further, the mobile radiotelephone connecting apparatus 12, 22 and 52 have a function for translating a telephone number transmitted from a mobile radiotelephone set into an address of the LAN 1 and transferring the telephone number to a mobile radiotelephone connecting apparatus having the translated address. The mobile radiotelephone connecting apparatus having the address collates the identifier of the mobile radiotelephone set transmitted thereto with a connectable telephone identifier list stored in advance therein and issues the coincident mobile radiotelephone connecting apparatus identifier and a notification representing that the transferred identifier is acceptable. Through this sequence, the two mobile radiotelephone sets are linked to each other and exchange necessary voice data. Ending of the telephone communication is performed such that any one of the mobile radiotelephone sets issues an ending notification and the other mobile radiotelephone set receives the notification and issues an acceptance notification.

Further, the identifiers of the mobile radiotelephone connecting apparatus 12, 22 and 52 and the identifiers of mobile radiotelephone sets connected to them are registered in the location reference server 92. As described above, a correspondence table of the mobile radiotelephone connecting apparatus identifiers and LAN addresses corresponding to them is built in the mobile radiotelephone connecting apparatus 12, 22 and 52.

In the configuration wherein many such mobile radiotelephone connecting apparatus as the mobile radiotelephone connecting apparatus 12, 22 and 52 are arranged locally, when the other party of telephone conversation moves locally, the mobile radiotelephone set possessed by the user having moved communicates with a proximate mobile radiotelephone connecting apparatus in a fixed time unit using the low-power radio communication function or the optical communication function. The mobile radiotelephone connecting apparatus holds the identifier of the telephone set just mentioned and the identifier of a mobile radiotelephone connecting apparatus which is a base station of the mobile radiotelephone set as a connectable telephone identifier list. Then, a notification of the identifier of the mobile radiotelephone connecting apparatus which relays the mobile radiotelephone set is issued to the mobile radiotelephone connecting apparatus of the mobile radiotelephone set. The mobile radiotelephone connecting apparatus holds the identifier of the mobile radiotelephone connecting apparatus which relays as a movement destination of the mobile radiotelephone set. Further, a table wherein the mobile radiotelephone set identifier and the relaying mobile radiotelephone connecting apparatus identifier correspond to each other is recorded as present location information of the mobile radiotelephone set into the location reference server 92 in the LAN 1.

Further, the mobile radiotelephone connecting apparatus 12, 22 and 52 have a function for issuing an inquiry to the location reference server 92 which stores in advance a list indicating at what locations mobile radiotelephone sets are locally. Consequently, when a telephone set is used to originate a telephone call, such information as to which one of the mobile radiotelephone connecting apparatus the opposite mobile radiotelephone set is near can be obtained.

Where any one of the mobile radiotelephone connecting apparatus 12, 22 and 52 tries to establish a connection to the opposite mobile radiotelephone set, the mobile radiotelephone connecting apparatus issues an inquiry to the opposite mobile radiotelephone connecting apparatus to obtain an identifier of the relaying mobile radiotelephone connecting apparatus and establishes a connection to the relaying mobile radiotelephone connecting apparatus. Consequently, even if the opposite telephone set is moving locally, a connection to it can be established.

Further, as another connection method, also it is possible for any one of the mobile radiotelephone connecting apparatus 12, 22 and 52 to issue an inquiry to the location reference server 92 to obtain the identifier of a relaying mobile radiotelephone connecting apparatus and establish a connection to the relaying mobile radiotelephone connecting apparatus.

Further, transmission and reception of not only telephone voice but also a message from the mobile radiotelephone set 11, 21 or 51 to the personal computer 13 or 23 connected to the LAN 1 or vice versa is possible.

Where the mobile radiotelephone set 11, 21 or 51 is connected to a mobile radiotelephone connecting apparatus when the user tries to transmit data from the mobile radiotelephone set 11, 21 or 51 to the personal computer possessed by the user, if registered identifier reference is performed to detect that the telephone set exhibits no movement, then a connection can be established directly. In this case, maximum data transfer which does not rely upon the rate of the LAN 1 at that time can be obtained.

Further, where the mobile radiotelephone sets 11, 21 and 51 can treat not only voice but also a text message and so forth, the user performs text message exchanging between a text in the mobile radiotelephone set and the personal computer possessed by the user in the following manner. In particular, upon data accessing from the mobile radiotelephone set to the personal computer, where the personal computer is positioned nearby, the text message exchanging is performed directly between the mobile radiotelephone set and the personal computer. On the other hand, where the mobile radiotelephone set is in the local area wherein the LAN can be used, the mobile radiotelephone set is connected to the personal computer through the mobile radiotelephone connecting apparatus to which the personal computer is connected through the LAN 1 from the proximate mobile radiotelephone connecting apparatus to perform the text message exchanging.

(2) Description of the Operation

In the following, operation of the mobile radiotelephone connecting system is described in detail with reference to FIGS. 1 to 8.

Figure 5:
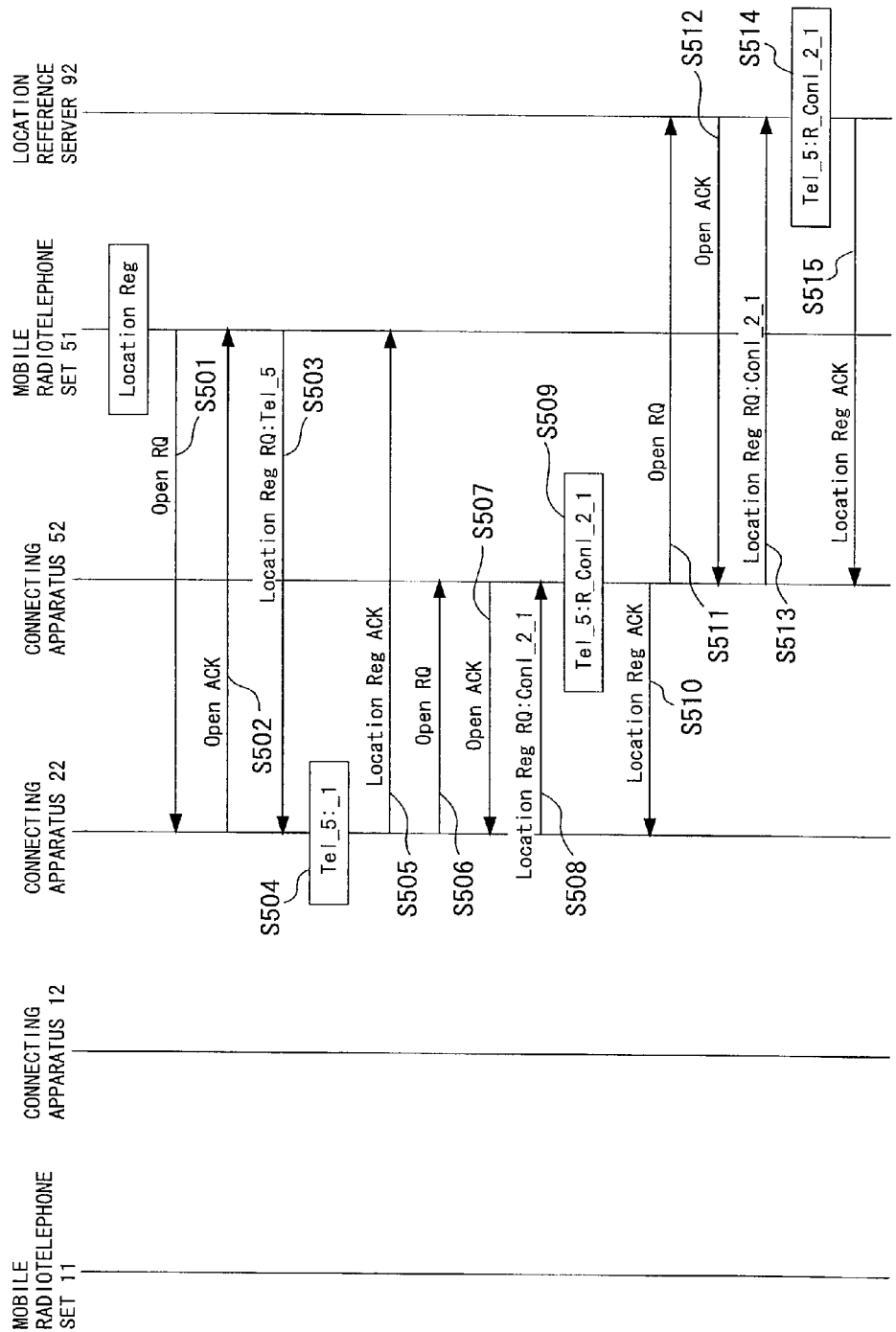
FIG. 5 is a sequence diagram illustrating operation for location registration of the local mobile radiotelephone system of FIG. 1 when the mobile radiotelephone set moves.

FIG. 5 illustrates operation when the mobile radiotelephone set 51 moves to cut a connection to the mobile radiotelephone connecting apparatus 52 and establishes a connection to the mobile radiotelephone connecting apparatus 22.

Referring to FIG. 5, the mobile radiotelephone set 51 first transmits a line open request (Open RQ (Open Request)) to the mobile radiotelephone connecting apparatus 22 (S501), and the mobile radiotelephone connecting apparatus 22 receives the request and sends back an open acknowledge (Open ACK (Open Acknowledge)) (S502). Then, the mobile radiotelephone set 51 transmits a location registration request (Location Reg RQ (Location Registration Request)) including the identifier Tel_5 of the mobile radiotelephone set 51 itself (S503). Then, the mobile radiotelephone connecting apparatus 22 records a record which includes the identifier Conl_5 of the mobile radiotelephone connecting apparatus 52 as a value of the field for a mobile radiotelephone connecting apparatus and the identifier Tel_5 of the mobile radiotelephone set 51 as a value of the field for a mobile radiotelephone set into the relay table 134-2 (S504).

It is to be noted that the identifier Conl_5 of the mobile radiotelephone connecting apparatus 52 is searched out as the identifier of a mobile radiotelephone connecting apparatus corresponding to the identifier Tel_5 of the mobile radiotelephone set 51 from within the initial location table 131 included in the mobile radiotelephone connecting apparatus 22. Then, the mobile radiotelephone connecting apparatus 22 transmits a location registration acknowledge (Location Reg ACK (Location Registration Acknowledge)) to the mobile radiotelephone set 51 (S505).

Then, the mobile radiotelephone connecting apparatus 22 transmits the line open request (Open RQ) to the mobile radiotelephone connecting apparatus 52 (S506), and the mobile radiotelephone connecting apparatus 52 receives the request and sends back an open acknowledge (Open ACK) to the mobile radiotelephone connecting apparatus 22 (S507). Then, the mobile radiotelephone connecting apparatus 22 transmits the location registration request (Location Reg RQ) to the mobile radiotelephone connecting apparatus 52 (S508). The location registration request includes the identifier Conl_2 of the mobile radiotelephone connecting apparatus 22 and the identifier Tel_5 of the mobile radiotelephone set 51. Thereafter, the mobile radiotelephone connecting apparatus 52 registers the identifier Conl_2 of the mobile radiotelephone connecting apparatus 22 into the field for a relaying mobile radiotelephone connecting apparatus of the record of the base table 133-3 which includes the identifier Tel_5 of the mobile radiotelephone set 51 as a value of the field for an identifier of a mobile radiotelephone set using the identifier Conl_2 of the mobile radiotelephone connecting apparatus 22 and the identifier Tel_5 of the mobile radiotelephone set 51 both included in the location registration request received at step S508 (S509). Further, the mobile radiotelephone connecting apparatus 52 transmits the location registration acknowledge (Location Reg ACK) back to the mobile radiotelephone connecting apparatus 22 (S510).

Thereafter, the mobile radiotelephone connecting apparatus 52 transmits a line open request (Open RQ) to the location reference server 92 (S511), and the location reference server 92 sends back an open acknowledge (Open-ACK) to the mobile radiotelephone connecting apparatus 52 (S512). Then, the mobile radiotelephone connecting apparatus 52 transmits the location registration request (Location RegRQ) to the location reference server 92 (S513). The location registration request includes the identifier Conl_2 of the mobile radiotelephone connecting apparatus 22 and the identifier Tel_5 of the mobile radiotelephone set 51. Then, the location reference server 92 registers the identifier Conl_2 of the mobile radiotelephone connecting apparatus 22 into the field for a relaying mobile radiotelephone connecting apparatus of the record of the dynamic location table 135 which includes the identifier Tel_5 of the mobile radiotelephone set 51 as a value of the field for an identifier of a mobile radiotelephone set using the identifier Conl_2 of the mobile radiotelephone connecting apparatus 22 and the identifier Tel_5 of the mobile radiotelephone set 51 both included in the location registration request received at step S513 (S514). Further, the location reference server 92 transmits a location registration acknowledge (Location Reg ACK) back to the mobile radiotelephone connecting apparatus 52 (S510).

As a result of the operations at steps S501 to S515, the tables 134-2, 134-3 and 135 have such values as seen in FIG. 2.

Figure 6:
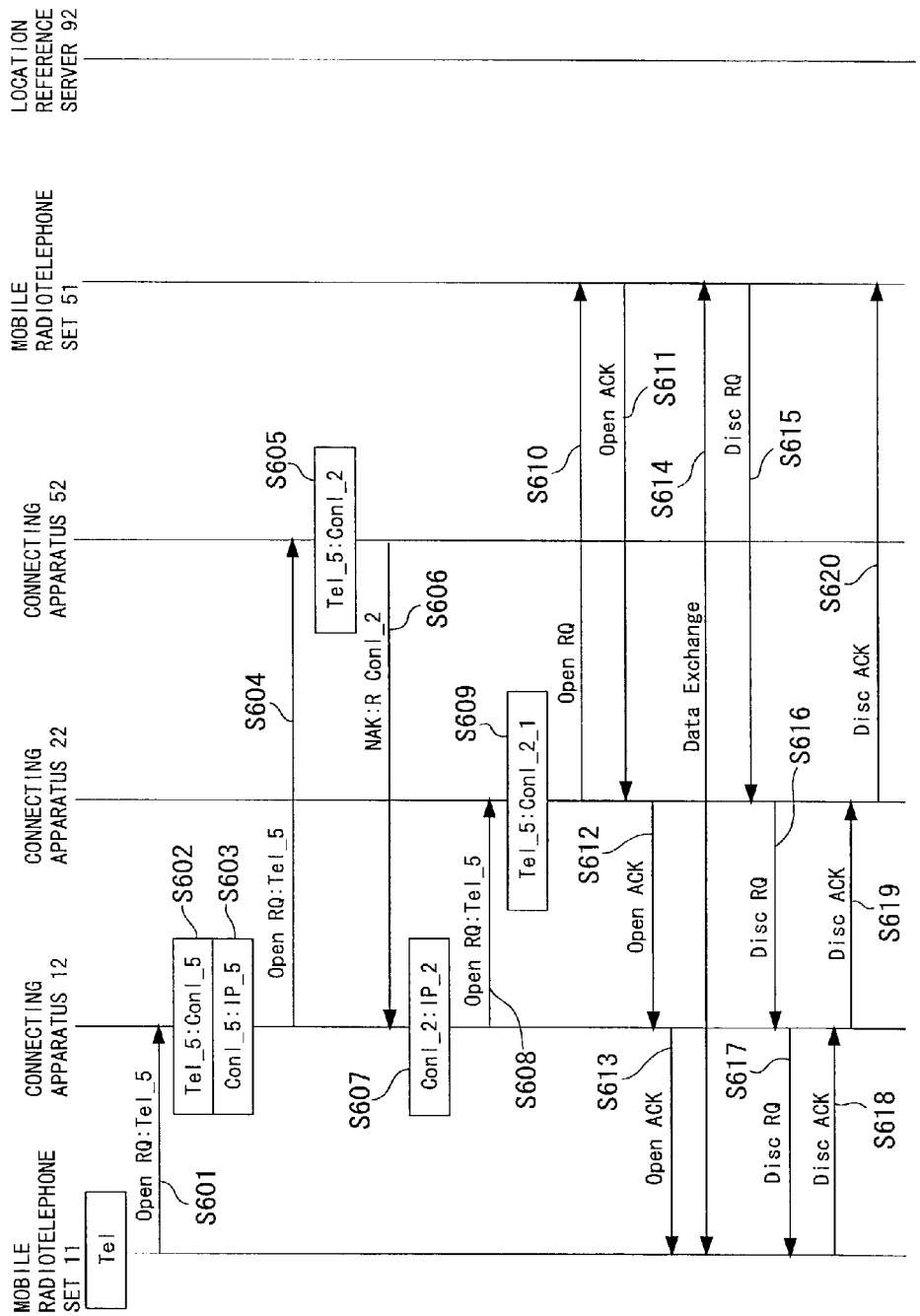
FIG. 6 is a sequence diagram illustrating operation of the local mobile radiotelephone system of FIG. 1 wherein an inquiry to the location reference server is not issued when a telephone call is originated from a mobile radiotelephone set to another mobile radiotelephone set.

FIG. 6 is a sequence diagram when a telephone call is originated from the mobile radiotelephone set 11 to the mobile radiotelephone set 51. In particular, FIG. 6 illustrates operation when a telephone call is originated from the mobile radiotelephone set 11 to the mobile radiotelephone set 51 through the mobile radiotelephone connecting apparatus 12, LAN 1 and mobile radio telephone connecting apparatus 22. In the sequence of FIG. 6, the location reference server 92 is not utilized.

Referring to FIG. 6, the mobile radiotelephone set 11 first transmits a line open request 601 to the mobile radiotelephone connecting apparatus 12 connected to the mobile radiotelephone set 11 (S601). The line open request includes the telephone number Tel_5 of the mobile radiotelephone set 51. The mobile radiotelephone connecting apparatus 12 searches for the identifier Conl_5 (abbreviation of Console #5) of a mobile radiotelephone connecting apparatus corresponding to the telephone number Tel_5 from within the initial location table 131 and searches for the IP address IP_5 corresponding to the identifier Conl_5 from within the mobile radiotelephone connecting apparatus IP address table 132 (S603), and transmits a line open request to the mobile radiotelephone connecting apparatus 52 using the IP address IP_S (S604).

Since the base table 133-3 includes the identifier Conl_2 corresponding to the telephone number TEL_5, the mobile radiotelephone connecting apparatus 52 discriminates that the mobile radiotelephone set 51 is connected to the relaying mobile radiotelephone connecting apparatus 22 (S605) and transmits a negative acknowledge NAK (Negative Acknowledge) back to the mobile radiotelephone connecting apparatus 12 (S606). The negative acknowledge includes the identifier Conl_2 of the mobile radiotelephone connecting apparatus 22. The mobile radiotelephone connecting apparatus 12 receives the negative acknowledge, searches for the IP address IP_2 corresponding to the identifier Conl_2 of the mobile radiotelephone connecting apparatus 22 included in the negative acknowledge from within the mobile radiotelephone connecting apparatus IP address table 132 (S607) and transmits a line open request to the mobile radiotelephone connecting apparatus 22 using the IP address IP_(S608).

The mobile radiotelephone connecting apparatus 22 receives the line open request, confirms that the telephone number Tel_5 included in the line open request is recorded in the relay table 134-2 (S609) and transmits the line open request to the mobile radiotelephone set 51 (S610).

The mobile radiotelephone set 51 connected to the mobile radiotelephone connecting apparatus 22 receives the line open request and transmits an open acknowledge (Open_ACK) back to the mobile radiotelephone connecting apparatus 22 (S611). The mobile radiotelephone connecting apparatus 22 receives the open acknowledge from the mobile radiotelephone set 51 and transfers it to the mobile radiotelephone connecting apparatus 12 (S612). The mobile radiotelephone connecting apparatus 12 receives the open acknowledge from the mobile radiotelephone connecting apparatus 22 and transfers it to the mobile radiotelephone set 11 (S613). Thereafter, communication is performed between the mobile radiotelephone set 11 and the mobile radiotelephone set 51 (S614).

The procedure of disconnection of the line when the communication comes to an end is started when the mobile radiotelephone set 11 or the mobile radiotelephone set 51 transmits a disconnection request (Disc RQ (Disconnection Request)). Here, if it is assumed that the mobile radiotelephone set 51 transmits the disconnection request, then the mobile radiotelephone set 51 first transmits the disconnection request to the mobile radiotelephone connecting apparatus 22 (S615).

The mobile radiotelephone connecting apparatus 22 receives the disconnection request from the mobile radiotelephone set 51 and transfers it to the mobile radiotelephone connecting apparatus 12 (S616). The mobile radiotelephone connecting apparatus 12 receives the disconnection request from the mobile radiotelephone connecting apparatus 22 and transfers it to the mobile radiotelephone set 11 (S617). The mobile radiotelephone set 11 receives the disconnection request from the mobile radiotelephone connecting apparatus 12 and transmits a disconnection acknowledge (Disc ACK (Disconnection Acknowledge)) to the mobile radiotelephone connecting apparatus 12 (S618).

The mobile radiotelephone connecting apparatus 12 receives the disconnection acknowledge from the mobile radiotelephone set 11 and transfers it to the mobile radiotelephone connecting apparatus 22 (S619). The mobile radiotelephone connecting apparatus 22 receives the disconnection acknowledge from the mobile radiotelephone connecting apparatus 12 and transfers it to the mobile radiotelephone set 51 (S620). The communication is disconnected thereby.

Figure 7:
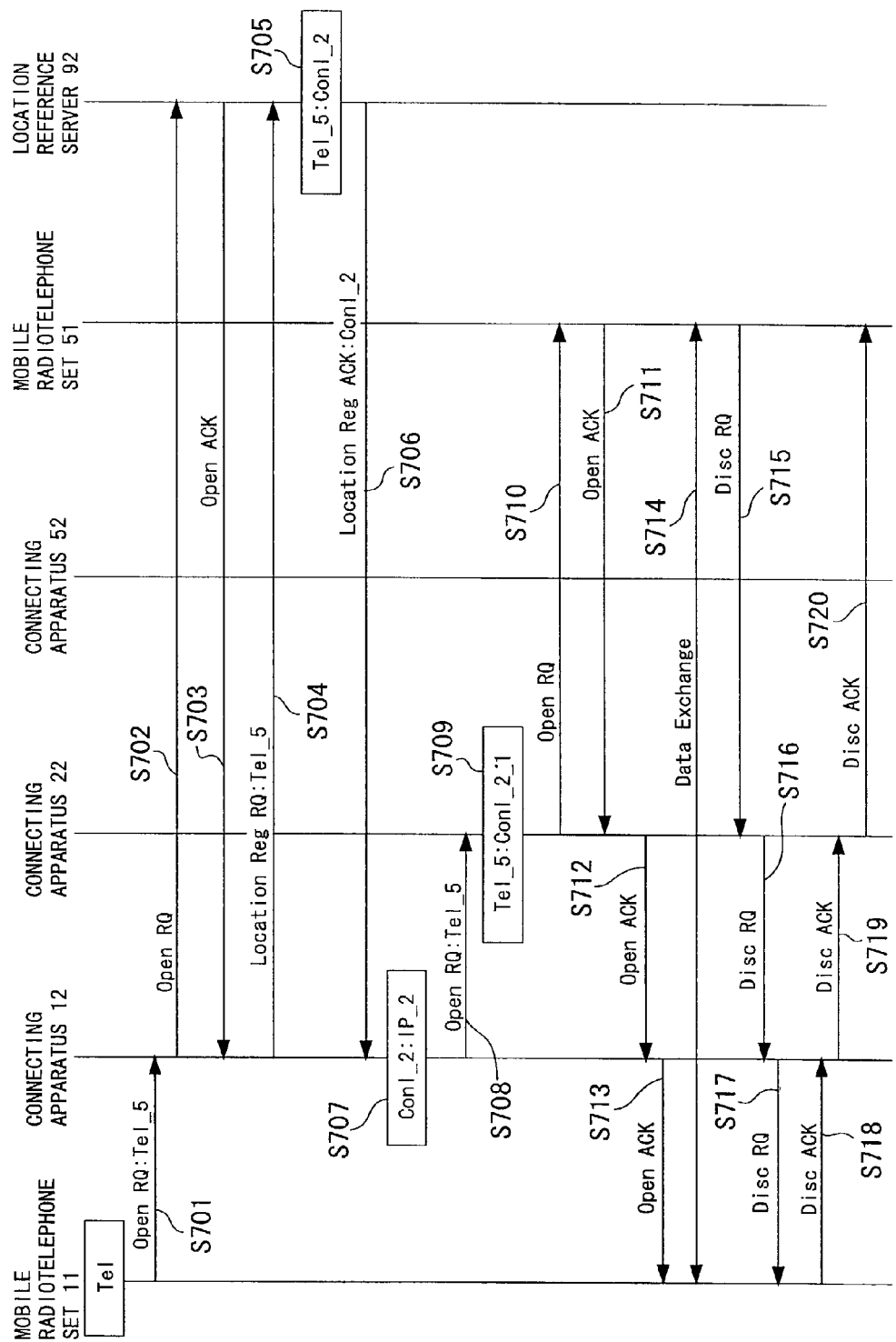
FIG. 7 is a sequence diagram illustrating operation of the local mobile radiotelephone system of FIG. 1 wherein an inquiry to the location reference server is issued when a telephone call is originated from a mobile radiotelephone set to another mobile radiotelephone set.

FIG. 7 illustrates operation when a telephone call is originated from the mobile radiotelephone set 11 to the mobile radiotelephone set 51 through the mobile radiotelephone connecting apparatus 12, LAN 1 and mobile radiotelephone connecting apparatus 22. In this instance, however, an inquiry for a relaying mobile radiotelephone connecting apparatus (22) is issued to the location reference server 92.

Referring to FIG. 7, the mobile radiotelephone set 11 first transmits a line open request 601 to the mobile radiotelephone connecting apparatus 12 connected to the mobile radiotelephone set 11 (5701). The line open request includes the telephone number Tel_5 of the mobile radiotelephone set 51. Then, the mobile radiotelephone connecting apparatus 12 transmits the line open request to the location reference server 92 (S702). Then, the location reference server 92 sends back an open acknowledge (Open ACK) to the mobile radiotelephone connecting apparatus 12 (S703). Then, the mobile radiotelephone connecting apparatus 12 transmits a location registration notification request (Location Reg RQ) to the location reference server 92 (S704). The location registration notification request includes the telephone number Tel_5 of the mobile radiotelephone set 51. Then, the location reference server 92 searches for the identifier Conl_2 of a relaying mobile radiotelephone connecting apparatus corresponding to the telephone number from within the dynamic location table 135 (S705), and transmits a location registration acknowledge including the identifier Conl_2 to the mobile radiotelephone connecting apparatus 12 (S706). Since the later steps S706 to S720 are similar to the steps S607 to S620, description of the steps is omitted.

In the sequence described above with reference to FIG. 7, if a telephone call is connected from the mobile radiotelephone set 11 to the mobile radiotelephone connecting apparatus 12 through the Bluetooth interface 11-1 of the mobile radiotelephone set 11 and the Bluetooth interface 12-1 of the mobile radiotelephone connecting apparatus 12, then the mobile radiotelephone connecting apparatus 12 establishes a connection to the mobile radiotelephone set 51 through the LAN 1, mobile radiotelephone connecting apparatus 22, Bluetooth interface 22-1 of the mobile radiotelephone connecting apparatus 22 and the Bluetooth interface 51-1 of the mobile radiotelephone set 51. Since the mobile radiotelephone connecting apparatus 12 can be informed of by issuing an inquiry to the mobile radiotelephone connecting apparatus 52 corresponding to the location reference server 92 or the mobile radiotelephone set 51 that the connection from the mobile radiotelephone set 11 to the mobile radiotelephone set 51 is established through the mobile radiotelephone connecting apparatus 22, administration of the local mobile radiotelephone system is allowed.

Figure 8:
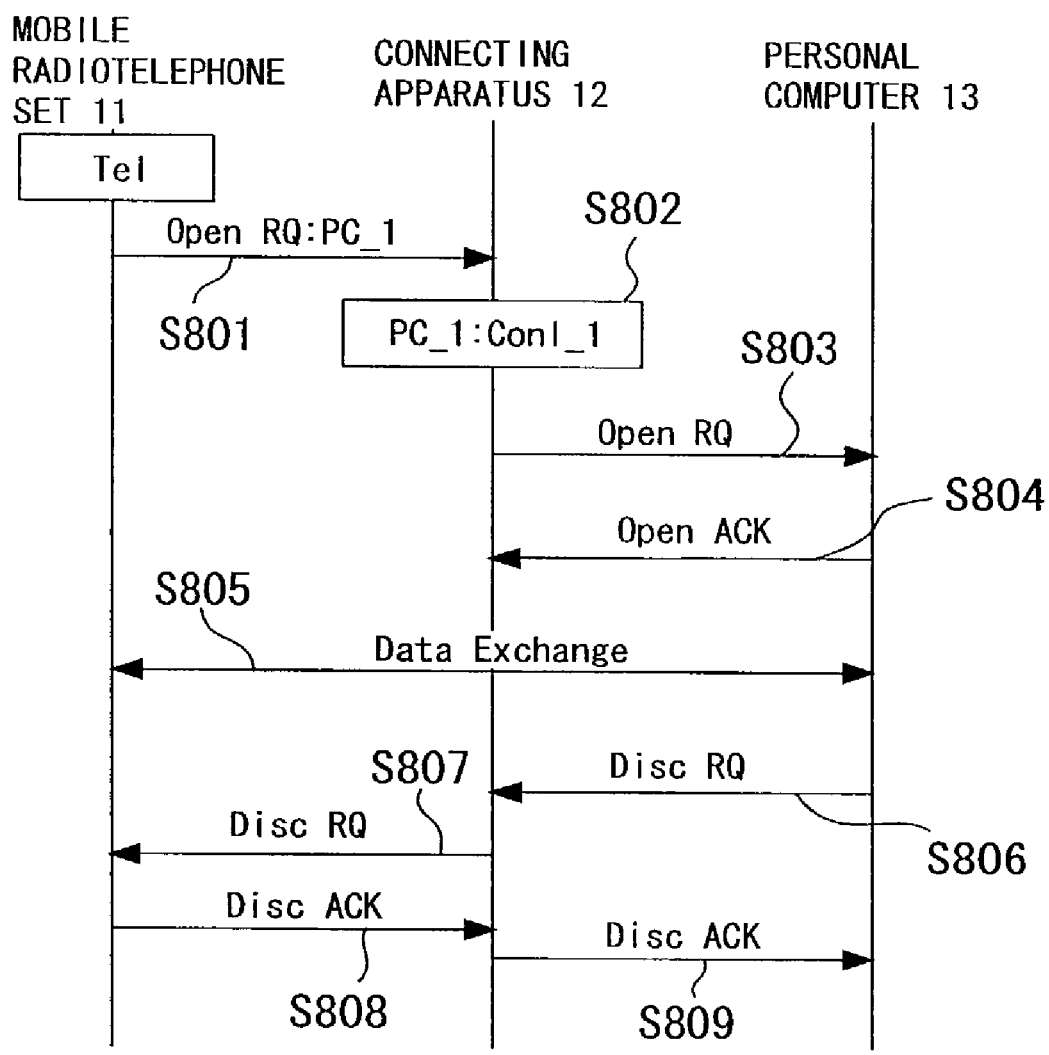
FIG. 8 is a sequence diagram illustrating operation of the local mobile radiotelephone system of FIG. 1 when the mobile radiotelephone set and the personal computer communicate with each other through the mobile radiotelephone connecting apparatus.

FIG. 8 illustrates operation when the mobile radiotelephone set 11 and the personal computer 13 communicate with each other through the mobile radiotelephone connecting apparatus 12.

Referring to FIG. 8, the mobile radiotelephone set 11 first transmits a line open request (Open RQ) to the mobile radiotelephone connecting apparatus 12 (S801). The circuit open request includes the identifier PC_1 of the personal computer 13 as a destination of the connection. The mobile radiotelephone connecting apparatus 12 recognizes that the personal computer 13 is connected to the mobile radiotelephone connecting apparatus 12 itself (S802). The mobile radiotelephone connecting apparatus 12 transmits the line open request (Open RQ) to the personal computer 13 making use of the identifier PC_1 of the personal computer 13 included in the line open request received at step S801 (S803). The personal computer 13 transmits an open acknowledge (Open ACK) back to the mobile radiotelephone connecting apparatus 12 (step S804).

Then, the mobile radiotelephone set 11 and the personal computer 13 perform data communication therebetween (S805). The procedure for disconnection of the line when the communication comes to an end begins when the mobile radiotelephone set 11 or the personal computer 13 transmits a disconnection request (Disc RQ). If it is assumed here that the personal computer 13 transmits the disconnection request, the personal computer 13 first transmits a disconnection request (Disc RQ) to the mobile radiotelephone connecting apparatus 12 (S806). The mobile radiotelephone connecting apparatus 12 receives the disconnection request from the personal computer 13 and transfers it to the mobile radiotelephone set 11 (S807). The mobile radiotelephone set 11 receives the disconnection request from the mobile radiotelephone connecting apparatus 12 and transmits a disconnection acknowledge (Disc ACK) to the mobile radiotelephone connecting apparatus 12 (S808). The mobile radiotelephone connecting apparatus 12 receives the disconnection acknowledge from the mobile radiotelephone set 11 and transfers it to the personal computer 13 (S809). The communication is disconnected thereby.

It is to be noted that, if the LAN in the mobile radiotelephone connecting system is replaced with a WAN (Wide Area Network) such as the Internet, then a mobile radiotelephone set can be used for communication also to a remote location making use of a mobile radio telephone connecting apparatus. Further, even where such LANs are connected to each other through a WAN to construct a VPN, a mobile radiotelephone set can be used for communication between offices at remote locations making use of a mobile radio telephone connecting apparatus.

Further, while, in the mobile radiotelephone connecting system described above, a mobile radiotelephone set, a connecting apparatus, a personal computer and a location reference server perform communication in accordance with the TCP/IP, the UDP/IP may be used for communication in place of the TCP/IP.

Furthermore, while, in the mobile radiotelephone connecting system described above, a mobile radiotelephone set and a connecting apparatus communicate with each other using the Bluetooth, they may other communicate with each other using some other low-power radio system.

While a preferred embodiment of the present invention has been described using specific terms, such description is for illustrative purposes only, and it is to be understood that changes and variations may be made without departing from the spirit or scope of the following claims.

What is claimed is:

1. A mobile radiotelephone connecting apparatus, comprising:
    first communication means for performing first communication with a mobile radiotelephone set by low-power radio communication or optical communication;
    second communication means for performing second communication with a second mobile radiotelephone connecting apparatus through a network;
    relaying means for relaying the first communication by said first communication means and the second communication by said second communication means;
    an initial location table for storing a corresponding relationship between identifiers of mobile radiotelephone sets and mobile radiotelephone connecting apparatus including said mobile radiotelephone connecting apparatus in an initial state;
    a mobile radiotelephone connecting apparatus address table for storing network addresses of the individual mobile radiotelephone connecting apparatus;
    first search means for searching, when a telephone call is originated from a mobile radiotelephone set to another mobile radiotelephone set, for the identifier of a mobile radiotelephone connecting apparatus corresponding to the identifier of the second mobile radiotelephone set from within said initial location table;
    second search means for searching for a network address corresponding to the searched out identifier of the mobile radiotelephone connecting apparatus from within said mobile radiotelephone connecting apparatus address table; and
    transmission means for transmitting a line open request including the identifier of the mobile radiotelephone set having originated the telephone call to the mobile radiotelephone connecting apparatus of the searched out network address.

2. A mobile radiotelephone connecting apparatus as claimed in claim 1, wherein communication between a mobile radiotelephone set which performs the first communication with said mobile radiotelephone connecting apparatus and another mobile radiotelephone set which performs the first communication with the second mobile radiotelephone connecting apparatus can be performed through said first communication means and said second communication means of said mobile radiotelephone connecting apparatus and said first communication means and said second communication means of the second mobile radiotelephone connecting apparatus.

3. A mobile radiotelephone connecting apparatus as claimed in claim 1, further comprising:
    third communication means for performing third communication with a computer; and
    second relaying means for relaying the first communication and the third communication.

4. A mobile radiotelephone connecting apparatus as claimed in claim 3, further comprising third relaying means for relaying the second communication and the third communication, and wherein communication between a mobile radiotelephone set which performs the first communication with said mobile radiotelephone connecting apparatus and said computer which performs the third communication with the second mobile radiotelephone connecting apparatus can be performed through the first communication and the second communication of said mobile radiotelephone connecting apparatus and the third communication and the second communication of the second mobile radiotelephone connecting apparatus.

5. A mobile radiotelephone connecting apparatus as claimed in claim 1, further comprising:
    a base table for storing, when a mobile radiotelephone set connected to said mobile radiotelephone connecting apparatus in the initial state moves and is connected to another mobile radiotelephone connecting apparatus, a corresponding relationship between the identifier of the radiotelephone set having moved and the identifier of the mobile radiotelephone connecting apparatus connected at the location after the movement;
    discrimination means for discriminating, when the line open request is received, whether or not the identifier of a mobile radiotelephone connecting apparatus corresponding to the identifier of the mobile radiotelephone set having originated the telephone call is stored in said base table;
    replying means for issuing, if the identifier of the mobile radiotelephone connecting apparatus corresponding to the identifier of the mobile radiotelephone set having originated the telephone call is stored in said base table, a negative acknowledge including the identifier of the mobile radiotelephone connecting apparatus to the line open request; and
    third search means for searching, when the negative acknowledge to the line open request is received, for a network address corresponding to the identifier of the mobile radiotelephone connecting apparatus included in the negative acknowledge from within said mobile radiotelephone connecting apparatus address table; and that
    said transmission means transmits a line open request including the identifier of the mobile ratio telephone set having originated the telephone call to a mobile radiotelephone connecting apparatus of the searched out network address corresponding to the identifier of the mobile radiotelephone connecting apparatus included in the negative acknowledge.

6. A mobile radiotelephone connecting system, comprising:
- a plurality of mobile radiotelephone connecting apparatus; and
- a location reference server including a dynamic location table for storing a corresponding relationship between identifiers of mobile radiotelephone sets and identifiers of those of said mobile radiotelephone communicating apparatus with which said mobile radiotelephone sets can currently communicate;
- each of said mobile radiotelephone connecting apparatus including:
- first communication means for performing first communication with a mobile radiotelephone set by low-power radio communication or optical communication;
- second communication means for performing second communication with a second mobile radiotelephone connecting apparatus through a network;
- relaying means for relaying the first communication by said first communication means and the second communication by said second communication means;
- a mobile radiotelephone connecting apparatus address table for storing network addresses of said mobile radiotelephone connecting apparatus;
- first search means for communicating, when a telephone call is originated from a first one of said mobile radiotelephone sets to second one of said mobile radiotelephone sets, with said location reference server to search for an identifier of a mobile radiotelephone connecting apparatus corresponding to an identifier of the second mobile radiotelephone set from within said dynamic location table;
- second search means for searching for the network address corresponding to the searched out identifier of the mobile radiotelephone connecting apparatus from within said mobile radiotelephone connecting apparatus address table; and
- transmission means for transmitting a line open request including the identifier of the mobile radiotelephone set having originated the telephone call to the mobile radiotelephone connecting apparatus of the search out network address.

* * * * *